(12) United States Patent
Kuester et al.

(10) Patent No.: US 11,491,740 B2
(45) Date of Patent: Nov. 8, 2022

(54) METHOD FOR FORMING COMPLEX HOLLOW MODELS FROM LOW MODULUS MATERIAL

(71) Applicant: 3D Systems, Inc., Rock Hill, SC (US)

(72) Inventors: Evan Kuester, Del Mar, CA (US); Joseph Fulerton, Denver, CO (US); Christopher Schneider, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 75 days.

(21) Appl. No.: 17/013,093

(22) Filed: Sep. 4, 2020

(65) Prior Publication Data

US 2021/0060869 A1 Mar. 4, 2021

Related U.S. Application Data

(60) Provisional application No. 62/895,715, filed on Sep. 4, 2019.

(51) Int. Cl.
| | |
|---|---|
| *B29C 69/02* | (2006.01) |
| *B29C 64/112* | (2017.01) |
| *B29C 64/30* | (2017.01) |
| *B29C 64/386* | (2017.01) |
| *B33Y 50/00* | (2015.01) |
| *B33Y 80/00* | (2015.01) |
| *B33Y 70/00* | (2020.01) |
| *B33Y 10/00* | (2015.01) |
| *B29L 31/00* | (2006.01) |
| *B29K 91/00* | (2006.01) |
| *B29K 83/00* | (2006.01) |

(52) U.S. Cl.
CPC ............ *B29C 69/02* (2013.01); *B29C 64/112* (2017.08); *B29C 64/30* (2017.08); *B29C 64/386* (2017.08); *B33Y 10/00* (2014.12); *B33Y 50/00* (2014.12); *B33Y 70/00* (2014.12); *B33Y 80/00* (2014.12); *B29K 2083/00* (2013.01); *B29K 2091/00* (2013.01); *B29L 2031/7532* (2013.01)

(58) Field of Classification Search
CPC ......... B33Y 10/00; B33Y 50/00; B33Y 70/00; B33Y 80/00; B29C 69/02; B29C 64/112; B29C 64/386; B29C 64/30; B29K 2083/00; B29L 2031/7532
See application file for complete search history.

(56) References Cited

U.S. PATENT DOCUMENTS

| | | |
|---|---|---|
| 5,435,959 A | 7/1995 | Williamson et al. |
| 2005/0110177 A1 | 5/2005 | Schulman et al. |
| | (Continued) | |

FOREIGN PATENT DOCUMENTS

WO WO-2017157851 A1 * 9/2017 ......... B29C 33/3842

*Primary Examiner* — Larry W Thrower

(57) ABSTRACT

A method is provided for manufacturing a complex hollow article from a flexible polymer material. The method includes using an additive manufacturing system to form a precursory structure that is formed from a build material and phase change material, melting and removing the phase change material, injecting uncured liquid flexible polymer material into a cavity defined by the build material, curing and solidifying the flexible polymer material, and cracking and removing the build material from the flexible polymer material to provide the hollow article.

20 Claims, 10 Drawing Sheets

(56) References Cited

U.S. PATENT DOCUMENTS

| | | | |
|---|---|---|---|
| 2011/0068502 A1* | 3/2011 | Basseas | B29C 33/0016 |
| | | | 249/55 |
| 2014/0305093 A1 | 10/2014 | Nevatia | |
| 2016/0083602 A1* | 3/2016 | Secord | C09D 11/30 |
| | | | 347/77 |
| 2017/0333980 A1 | 11/2017 | Yang et al. | |
| 2018/0001561 A1 | 1/2018 | Hascher et al. | |
| 2018/0154437 A1* | 6/2018 | Mark | B22F 1/10 |
| 2019/0077054 A1* | 3/2019 | Jessen | B29C 64/245 |

* cited by examiner

METHOD FOR FORMING COMPLEX HOLLOW MODELS FROM LOW MODULUS MATERIAL

CROSS-REFERENCE TO RELATED APPLICATIONS

This non-provisional patent application claims priority to U.S. Provisional Application Ser. No. 62/895,715, Entitled "Method for Forming Complex Hollow Models from Low Modulus Material" by Evan Kuester et al., filed on Sep. 4, 2019, incorporated herein by reference under the benefit of U.S.C. 119(e).

FIELD OF THE INVENTION

The present disclosure concerns a method of fabricating customized complex hollow articles from low modulus materials such as those used for medical implant simulations. More particularly, the present disclosure concerns a manufacturing workflow that is much more efficient and accurate than previous methods.

BACKGROUND

There are various purposes for customized hollow articles made from low modulus materials which may include medical, industrial, and consumer applications. One particular example is medical modeling of internal organs. The purpose of such a model is to allow a practice and rehearsal of a procedure. For example, a patient may be about to receive a cardiac implant or procedure. There is a desire to have a model of the actual heart so that a practitioner can carry out a simulation of the procedure using the exact heart external and internal geometry before performing the actual surgery. This will reduce a probability of error or unexpected difficulties. But making such a model has proven to be costly and difficult in the past.

SUMMARY

Figure 1:
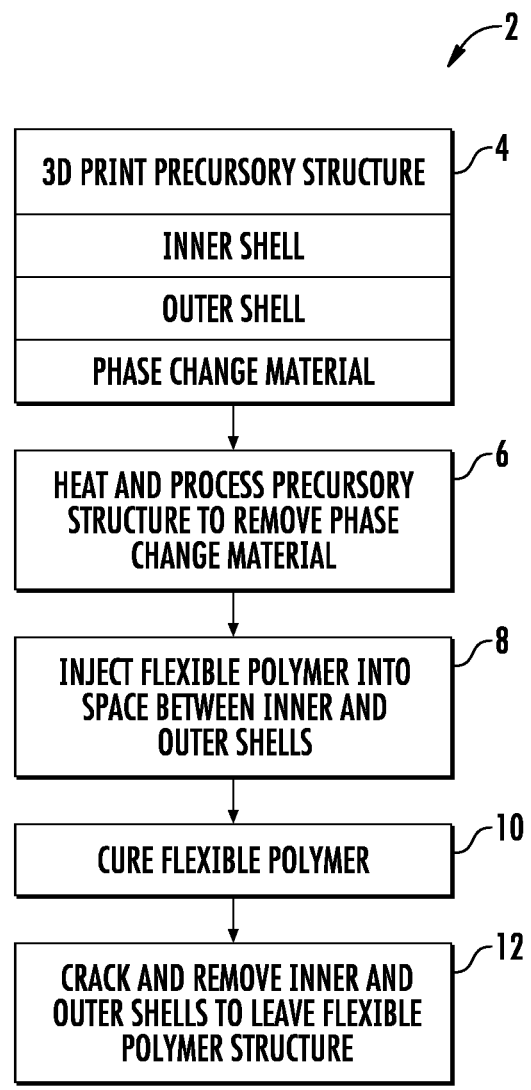
FIG. 1 is a flowchart depicting an exemplary embodiment of a method of manufacturing a complex hollow model from a cured, flexible, and low modulus material.

In an aspect of the disclosure, a method is provided for manufacturing a complex hollow article from a flexible polymer material. The method includes: (A) using an additive manufacturing system, forming a precursory structure including: (1) an inner shell formed from a build material having an outer surface for defining an inner surface of the hollow body, (2) an outer shell formed from the build material having an inner surface for defining an outer surface of the hollow body, (3) a first volume formed from a phase change material filling an inner cavity defined by an inner surface of the inner shell, (4) a second volume formed from the phase change material filling an outer cavity defined between the inner and outer shells, (5) a support structure formed from the phase change material coupled to an outer surface of the outer shell, (B) melting and removing the phase change material, (C) injecting uncured liquid flexible polymer material into the outer cavity, (D) curing and solidifying the uncured liquid flexible polymer to provide cured and solidified flexible polymer material, (E) cracking and removing the inner shell and the outer shell from the cured and solidified flexible polymer material to provide the hollow article.

In one implementation the additive manufacturing system is a three-dimensional printer including a build plate having an upper surface, an elevator mechanism coupled to the build plate, a printhead assembly, a movement mechanism coupled to the printhead assembly, and an ink supply coupled to the printhead assembly. Operating the additive manufacturing system includes: (1) operating the material supply to supply the build material and the phase change material to the printhead, (2) operating the elevator mechanism to position the upper surface at a build plane, (3) operating the movement mechanism and the printhead assembly to selectively deposit a two-dimensional pattern of the build material and the phase change material that is a cross-section layer of the precursory structure formed onto the upper surface, and (4) repeating operating the material supply, elevator mechanism, movement mechanism, and the printhead assembly to complete fabrication of the precursory structure.

In another implementation the melting and removing the phase change material removes at least 95 percent of the phase change material but leaves a thin layer of the phase change material upon surfaces of the inner and outer shell. The thin residue provides a release layer between the surfaces of the inner and outer shell and the cured flexible polymer material. This facilitates removal of the inner and outer shell from the cured flexible material during the cracking and removing.

In yet another implementation the inner and outer shell individually have a thickness of at least 0.5 millimeter. The thickness can be in a range of 0.5 to 1.0 millimeter.

In a further implementation the precursory structure includes a sprue that is coupled to the outer cavity and a vent coupled to the outer cavity. The vent can be a plurality of vents. Injecting the uncured flexible polymer material into the outer cavity includes coupling a supply of the uncured flexible polymer material to the sprue and causing displaced air to escape through the vent(s).

In a yet further implementation the build material includes an ultraviolet (UV) radiation curable photopolymer. The build material can include a combination of oligomeric and monomeric curable materials, a photoinitiator, a stabilizing agent, and a phase change wax component. The build material can have a tensile modulus of more than 1000 MPa after being cured. The build material can have an elongation at break of less than 20 percent or in a range of 6 and 12 percent.

In another implementation the phase change material can include a phase change wax component. The phase change wax component can include one or more of a hydrocarbon wax, a fatty alcohol wax, a fatty acid wax, a fatty acid ester wax, an aldehyde wax, an amide wax, and a ketone wax. The phase change material can also include a tackifier. The tackifier can include one or more of rosin ester and a rosin alcohol.

In yet another implementation the method of manufacturing can include, before forming the precursory structure, the following steps: (a) imaging an internal organ of a patient, (b) creating a three-dimensional (3D) body file of the internal organ geometry, (c) processing the 3D body file to define a 3D file of the precursory structure, and (d) preparing the 3D file of the precursory structure for printing with the additive manufacturing system. Processing the 3D body file in step (c) can include: (i) defining vents that couple to the outer cavity, (ii) defining a sprue that couples to the outer cavity, and (iii) defining the first volume, the second volume, and the support structure of the phase change material.

DETAILED DESCRIPTION OF THE PREFERRED EMBODIMENTS

FIG. 1 is a flowchart depicting an exemplary embodiment of a method 2 of manufacturing or fabricating a complex hollow model from a cured, flexible, and low modulus material. Compared to previous methods, method 2 is much more efficient and provides excellent dimensional accuracy and thickness uniformity for the model. In describing method 2, reference will be made to FIGS. 2A-D and 3A-D. FIGS. 3A-D are cross sections taken from FIGS. 2A-D with corresponding alpha indicia. FIG. 4A is a magnified view of FIG. 3A.

Figure 2A:
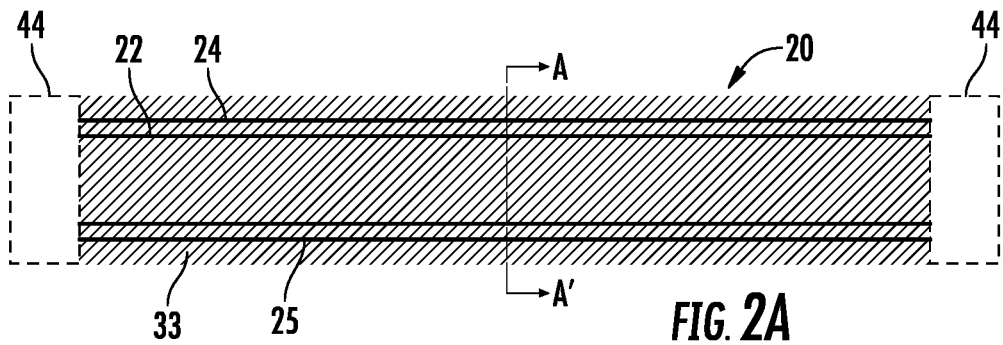
FIG. 2A is a schematic side cross-sectional view of a precursory structure.
Figure 3A:
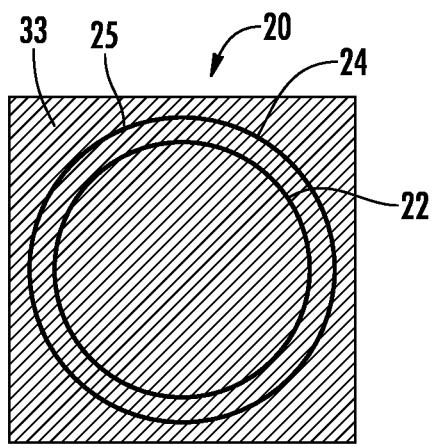
FIG. 3A is section AA' taken from FIG. 2A.
Figure 4A:
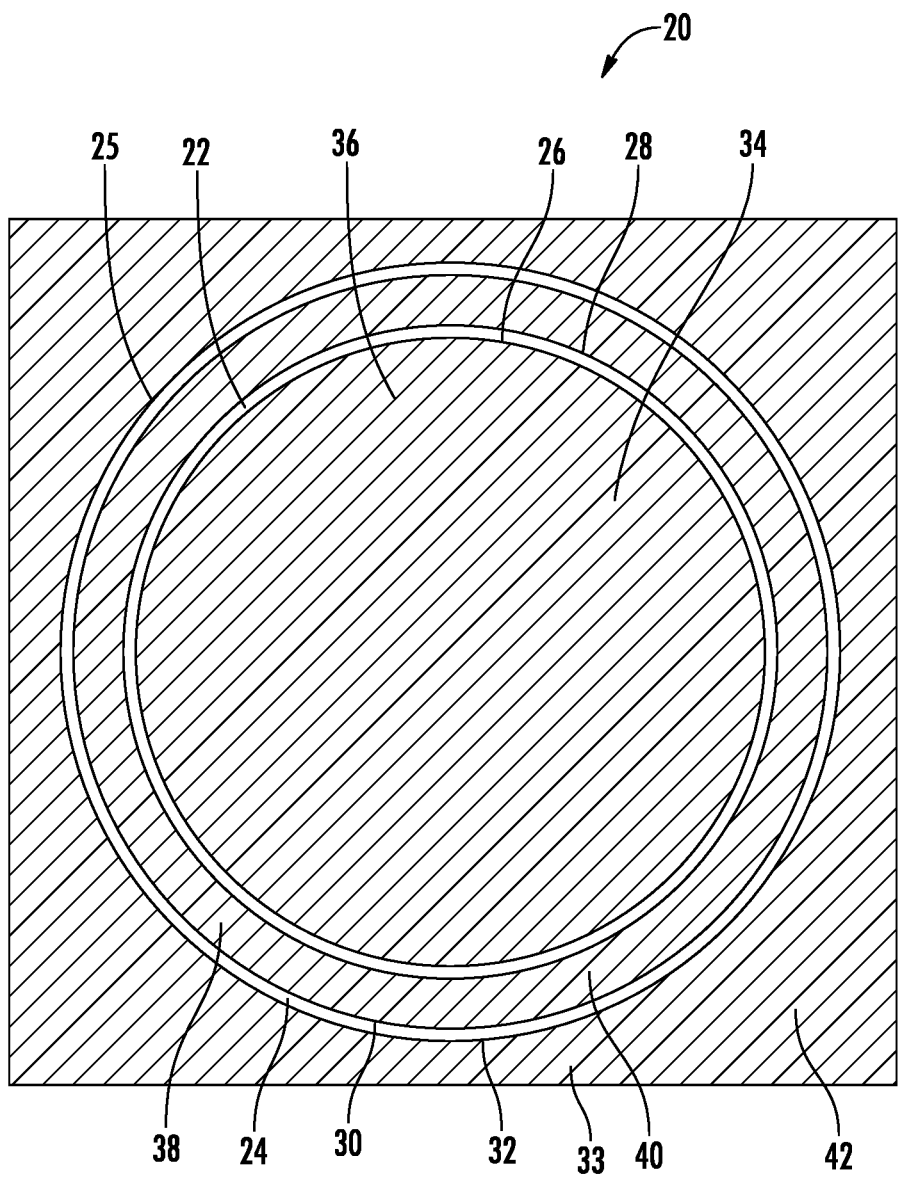
FIG. 4A is a magnified view of FIG. 3A.

According to 4, a precursory structure 20 is printed as illustrated in FIGS. 2A, 3A, and 4A. Precursory structure 20 includes an inner shell 22 and an outer shell 24 formed from build material 25. The outer shell 24 generally contains and surrounds the inner shell 22 over most of the structure 20. The inner shell 22 has an inner surface 26 and an outer surface 28 (FIG. 4A). The outer shell 24 has an inner surface 30 and an outer surface 32. The inner shell 22 and outer shell 24 are separated over most of the precursory structure 20 but are joined at certain locations that are not illustrated in the figures.

The precursory structure 20 also includes a phase change material 33. The phase change material 33 forms three portions or volumes according to their physical configuration or location within the precursory structure 20. A first portion 34 is within an inner cavity 36 defined by the inner surface 26 of inner shell 22. A second portion 38 is within an outer cavity 40 defined between the inner 22 and outer 24 shells. Outer cavity 40 is also defined between the outer surface 28 of the inner shell 22 and the inner surface 30 of the outer shell 24. A third portion 42 is defined outside of the outer surface 32 of the outer shell 24. The third portion 42 is coupled to the outer shell 24 to provide support during step 4 of method 2. The first 34, second 38, and third 42 portions of the phase change material 33 are physically separated by the inner 22 and outer 24 shells over most of the precursory structure but are joined at certain locations such as aperture portions 44 (FIG. 2A) of the precursory structure 20.

The build material 25 is a relatively high modulus and brittle material. Build material 25 includes a photocurable polymer and possible other components. On the other hand, the phase change material 33 is a material that is a solid at ordinary room temperatures and liquifies or melts above a certain threshold temperature.

The build material 25 would ideally have a tensile modulus above 1000 MPa (million pascals) and an elongation at break of less than 20 percent. In an illustrative example, the build material would have a tensile modulus of 2500-3000 MPa and an elongation at break in a range of 6 to 12 percent. The material would ideally contain a dark colorant so as to provide a visual contrast with a clear or translucent material used for the hollow model. The build material can contain a combination of oligomeric and monomeric curable materials, a photoinitiator, a stabilizing agent, and a phase change wax component.

The phase change material 33 includes a wax component. The phase change material typically contains 50-90% by weight phase change wax, 5-50% by weight tackifier, and other components. The phase change wax component can include a hydrocarbon wax, a fatty alcohol wax, a fatty acid wax, a fatty acid ester wax, an aldehyde wax, an amide wax, a ketone wax, or a mixture or combination thereof. The tackifier component can include a rosin ester, a rosin alcohol, or a mixture or combination thereof.

The phase change material 33 is generally a solid at 25 degrees Celsius and has a melting point somewhere in a range of 60 to 140 degrees Celsius or more particularly 80 to 100 degrees Celsius. The phase change material 33 can have a plurality of components that have different melting points and may therefore not exhibit a specific or distinct melting point.

Figure 2B:
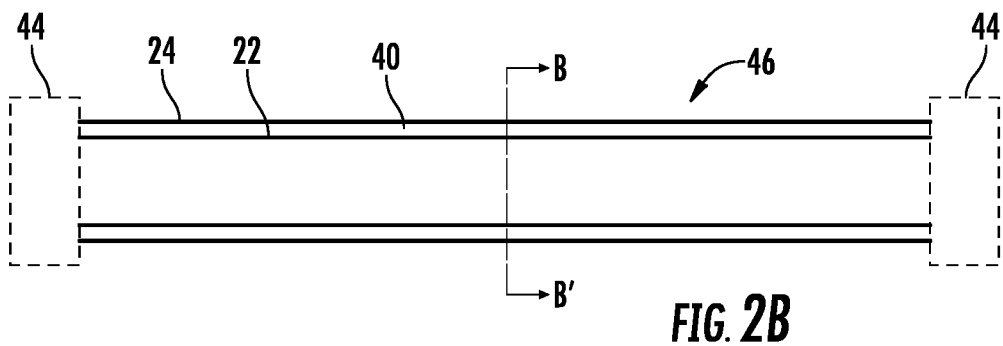
FIG. 2B is a schematic side cross-sectional view of a hollow mold structure.
Figure 3B:
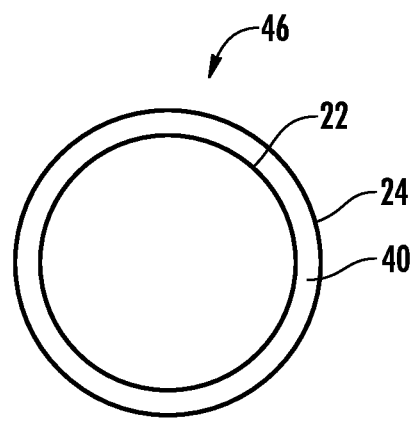
FIG. 3B is section BB' taken from FIG. 2B.

According to 6 of method 2, the precursory structure 20 is heated to melt and remove at least 95% of the mass of the phase change material 33. Step 6 can include orienting the precursory structure at a varying orientation to allow the melted phase change material 33 to drain. Step 6 can also include applying steam and/or a hot air gun to the precursory structure 20. Although the bulk of the phase change material 33 is removed in step 6, a thin layer of phase change material is left behind on surfaces of the build material 25. In particular, a thin layer of the phase change material 33 is left on the outer surface 28 of the inner shell 22 and on the inner surface 30 of the outer shell 24. The result is a hollow mold structure 46 as depicted in FIGS. 2B and 3B.

The aperture portions 44 of the mold structure include sprues and vents that are useful in the molding process. Sprues are essentially fluid inlets that allow a source of fluid to be coupled to the mold structure 46. The sprues are fluidically coupled to the outer cavity 40. The vents are also coupled to the outer cavity 40, and allow air and pressurized fluid to escape from the cavity 40.

Figure 2C:
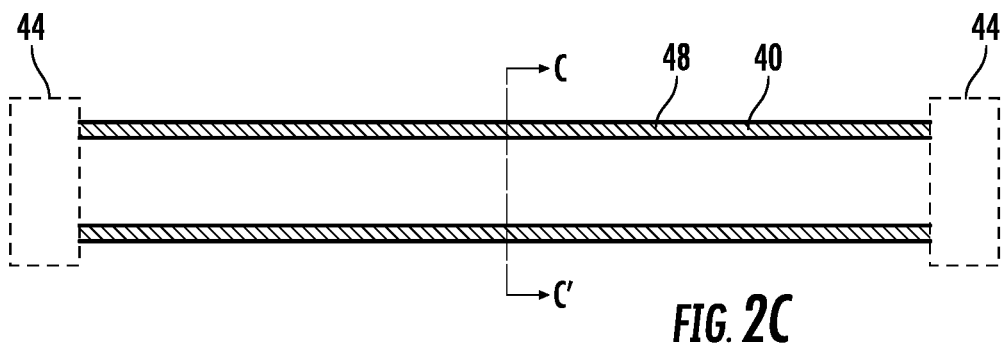
FIG. 2C is a schematic side cross-sectional view of a hollow mold into which a liquid uncured flexible polymer has been injected.
Figure 2D:
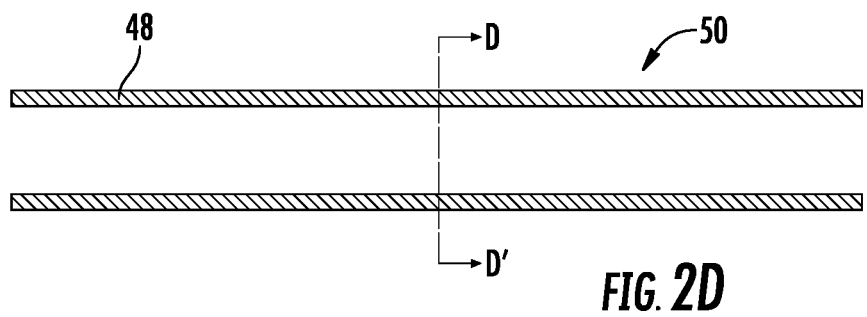
FIG. 2D is a schematic side cross-sectional view of a complex hollow model.
Figure 3C:
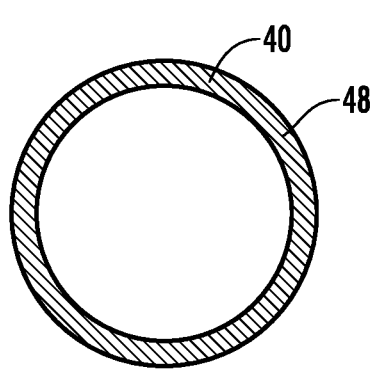
FIG. 3C is section CC' taken from FIG. 2C.
Figure 3D:
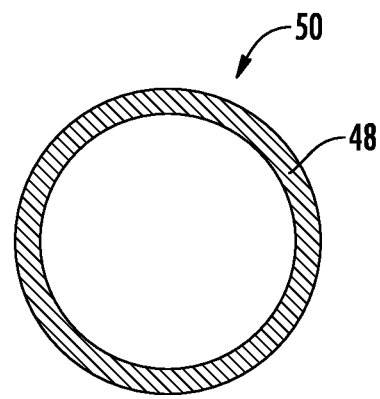
FIG. 3D is section DD' taken from FIG. 2D.

According to 8 of method 2, an uncured flexible polymer 48 in liquid form is injected into the cavity 40 as illustrated in FIGS. 2C and 3C. The uncured flexible polymer 48 is injected into the cavity via the sprues and air escapes the vents. According to 10 of method 2, the flexible polymer 48 is allowed to cure and solidify.

The flexible polymer 48 can have a wide range of hardness values from shore A values of less than 10 to more than 50. An important material parameter is elongation at break which tends to be measured using ASTM or ISO standards. The flexible polymer should have an elongation at break of at least 100%. More particularly, the elongation at break should be at least 150%, at least 200%, or at least 250%.

In some embodiments the flexible polymer 48 includes a rubber material such as silicone rubber. An example would be "SORTA-Clear™ 37" provided by Smooth-On, Inc. This is a silicone rubber polymer that is formed by mixing two mutually reactive components in equal parts. The cured material has a hardness of shore A 37 durometer (hence the name). The elongation at break is 400%. Other versions of this material can vary in hardness and elongation.

Another example is R-2550 silicone rubber provided by SILPAK, Inc. This is a two part material with a cured hardness of about shore A 50 durometer and an elongation at break of about 370%.

According to 12 of method 2, the inner 22 and outer 24 shells are cracked and removed from the cured flexible polymer 48. This removal is facilitated by the thin layer of the phase change material 33 left on surfaces of the build material 25 which functions as a release layer. Removal is also facilitated by a thin and brittle aspect of the inner 22 and outer 24 shells. The result is a complex hollow model 50 formed from the cured, flexible, low modulus material 48.

The cracking and removal of the shells 22 and 24 are facilitated by a difference in elongation at break between the flexible polymer 48 and the cured build material 25. We can define a variable R as the ratio of the elongation at break of the flexible polymer 48 to the ratio at elongation at break of the cured build material 25. R should be at least 5. More preferably, R can be at least 10, at least 15, at least 20, at least 25, at least 30, at least 35, and at least 40.

Figure 5:
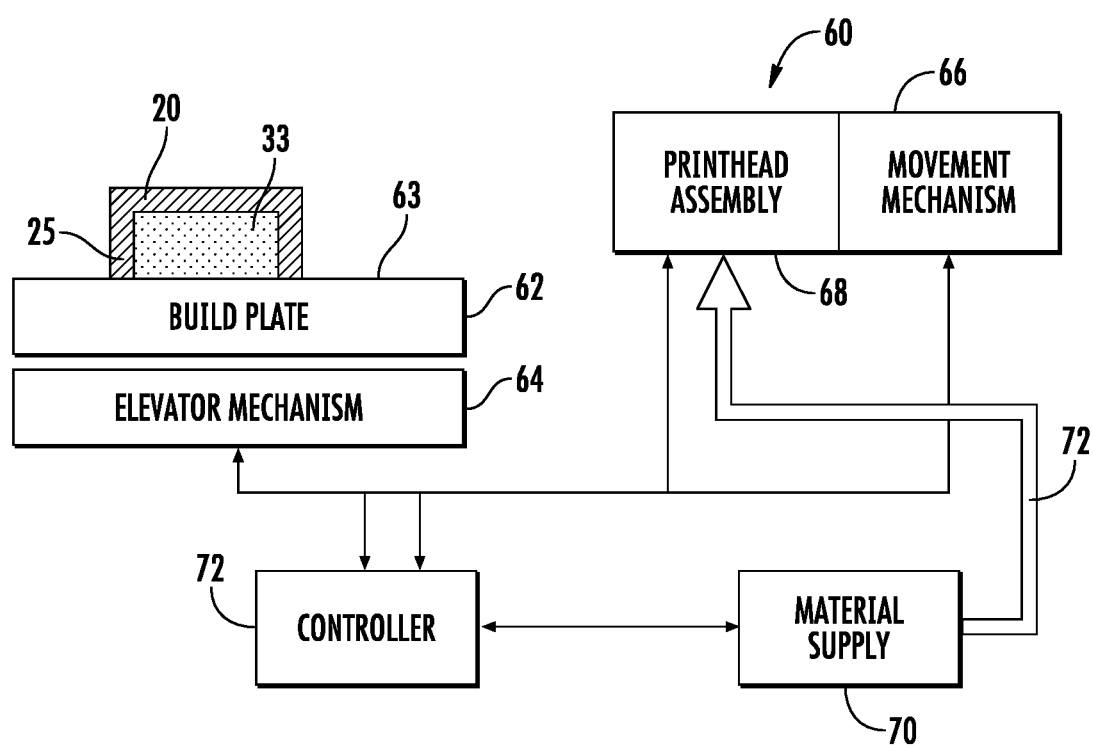
FIG. 5 is a schematic diagram of an embodiment of a three-dimensional printing system used to print a precursory structure.

FIG. 5 depicts an embodiment of a three-dimensional printing system 60 for fabricating the precursory structure 20. System 60 includes a build plate 62 for supporting the precursory structure 20. An elevator mechanism 64 is configured to raise and lower the build plate 62 during fabrication of the precursory structure 20.

A movement mechanism 66 is coupled to a printhead assembly 68. The movement assembly 66 is configured to scan the printhead assembly 68 along one or two lateral axes as the printhead assembly dispenses drops of build 25 and support 33 materials to form the precursory structure 20 in a layer-by-layer manner. A material supply 70 is configured to supply the build 25 and support 33 inks to the printhead assembly 68 via a heated conduit 72.

The elevator mechanism 64 and movement mechanism 66 are electromechanical mechanisms in nature and typically include an electric motor coupled to gears, a lead screw, and/or a belt for providing vertical and lateral transport. Such mechanisms are known in the art for two-dimensional (2D) and three-dimensional (3D) printing. The printhead assembly 68 can include mechanical and/or piezoelectric printheads that are known in the art for 2D and 3D printing.

A controller 72 is coupled to the elevator mechanism 64, movement mechanism 66, printhead assembly 68, material supply 70, and other portions of the system 60. The 72 includes a processor coupled to a non-transient or non-volatile information storage device that stores software instructions. When executed by the processor, the software instructions operate portions of system 60 to fabricate the precursory structure 20 in a layer-by-layer manner with the following steps: (1) operate the elevator mechanism 64 to position an upper surface of the build plate 62 (which may be an upper surface of a material disposed upon the build plate) at a build plane 63, (2A) operate the movement mechanism 66 to scan the printhead assembly 68 over the build plane 63, (2B) concurrent with (2A), operate the printhead to selectively deposit droplets of build material 25 and phase change material 33 to form a cross-sectional layer of the precursory structure 20, (3) apply radiation to cure the build material 25, and repeat (1), (2A), (2B), and (3) until the precursory structure is fabricated.

FIGS. 6-9 depict a manufacturing method of forming a medical model for a given patient. FIGS. 6 and 7A-F illustrate a method 100 for defining a file used by the printing system 60 to print the precursory structure 20. FIGS. 8A-D and 9 illustrate remaining steps of fabrication.

Figure 6:
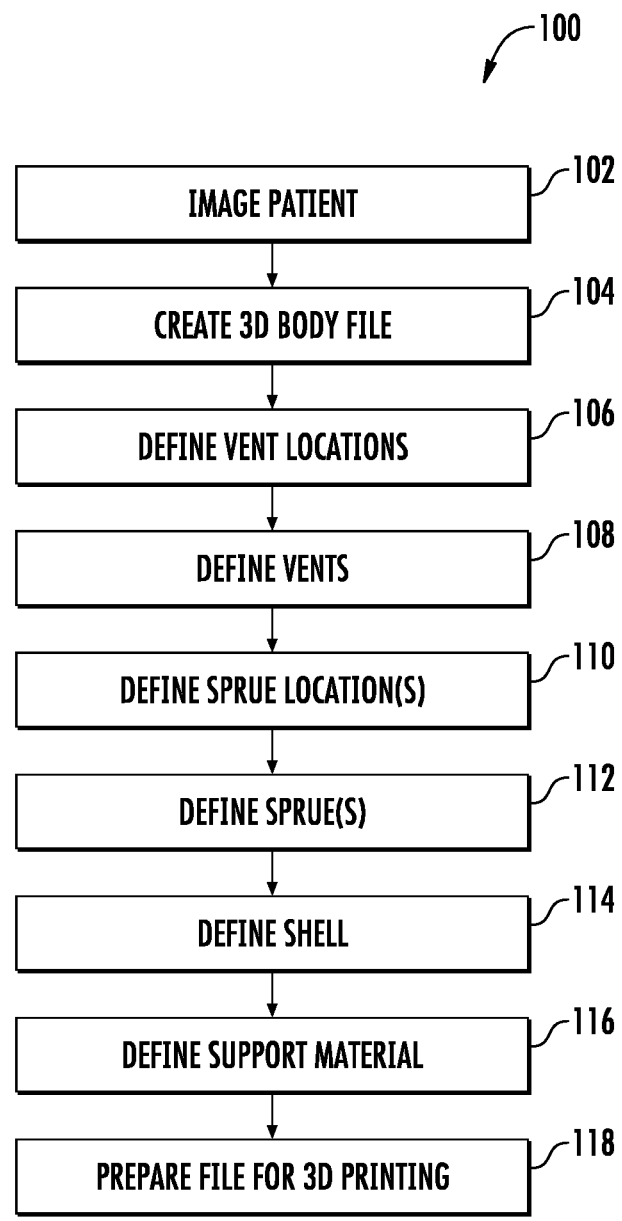
FIG. 6 is an embodiment of a method for defining a file used by a three-dimensional printing system to print a precursory structure.

FIG. 6 is a flowchart depicting the method 100. According to 102, an internal organ of a patient is imaged. Imaging can be accomplished with one or more of computed tomography scan (CT scan), magnetic resonance imaging (MRI), positron emission tomography scan (PET scan), or other known imaging techniques.

Figure 7A:
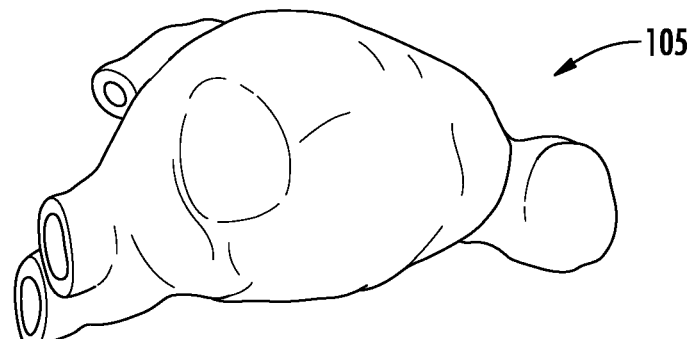
FIG. 7A is an illustration of a three-dimensional body resulting from imaging an internal organ of a patient.

According to 104, a three-dimensional (3D) body file is generated from the imaging. FIG. 7A illustrates a 3D body 105 that is a result of the imaging. In the illustrative embodiment, the 3D body 105 represents an internal organ upon which a surgical procedure is to be performed.

Figure 7B:
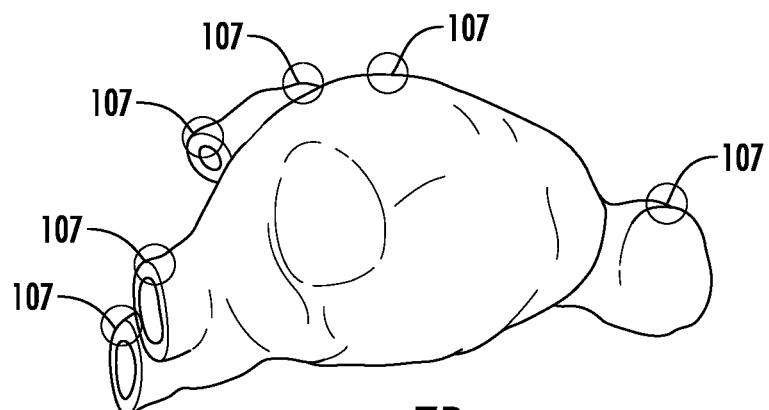
FIG. 7B is an illustration of the three-dimensional body of FIG. 7A with an indication of vent locations.
Figure 7C:
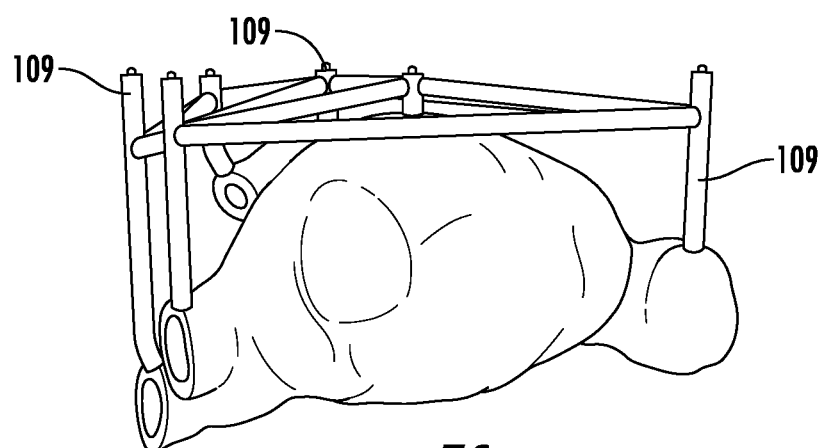
FIG. 7C is an illustration of the three-dimensional body of FIG. 7A with a vent structure defined.

According to 106, locations 107 for vents on the body 105 are defined. This is illustrated in FIG. 7B. According to 108, the vents 109 are defined. In the illustrated embodiment of FIG. 7C the vents 109 are shown as all oriented in a common direction.

Figure 7D:
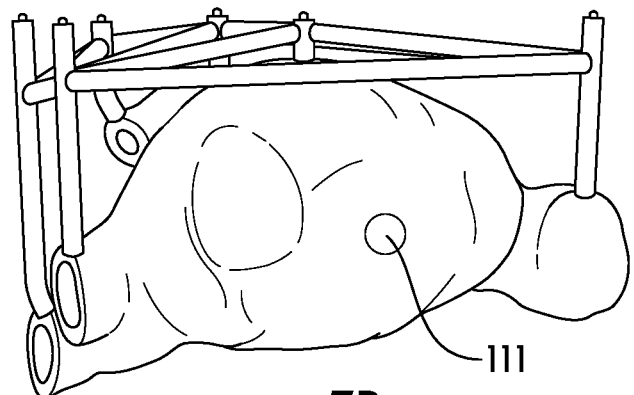
FIG. 7D is an illustration of the three-dimensional body of FIG. 7A with a vent structure defined and an indication of a location for a sprue.
Figure 7E:
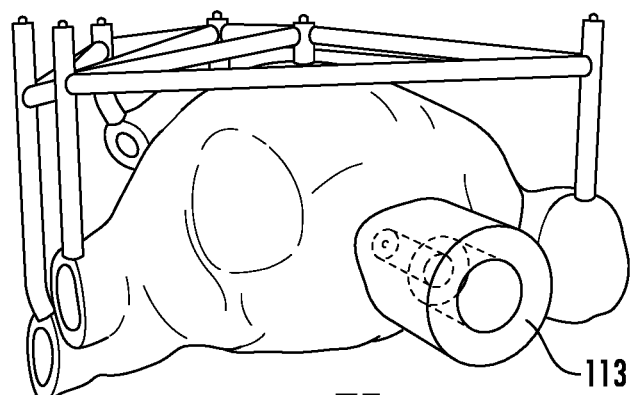
FIG. 7E is an illustration of the three-dimensional body of FIG. 7A with a vent structure and sprue defined.

According to 110, a sprue location 111 is defined as depicted in FIG. 7D. According to 112, the sprue 113 is defined.

Figure 7F:
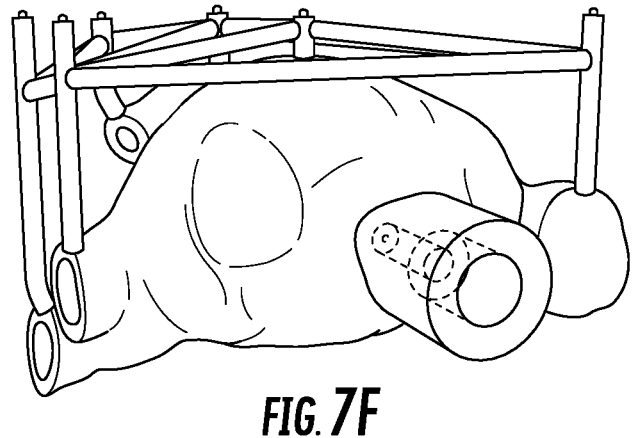
FIG. 7F is an illustration of a the mold structure 46 having been defined including inner and outer shells, a vent structure, and a sprue.

According to 114, the inner 22 and outer 24 shells are defined as depicted by FIG. 7F. The inner shell 22 is defined by "pushing" inwardly from an inner surface of the model 105. The outer shell 24 is defined by pushing outwardly from an outer surface of the model 105. Pushing inwardly or outwardly means to define a second surface that is normal to a particular surface so as to define a shell.

According to 116, the phase change material 33 is defined. The result is a file defining the precursory structure 20. According to 118, the file from step 116 is prepared to be sent to the printing system 60 for printing the physical precursory structure. It is to be understood that the steps 106-114 could be defined in a different order or could have different implementations.

Figure 8A:
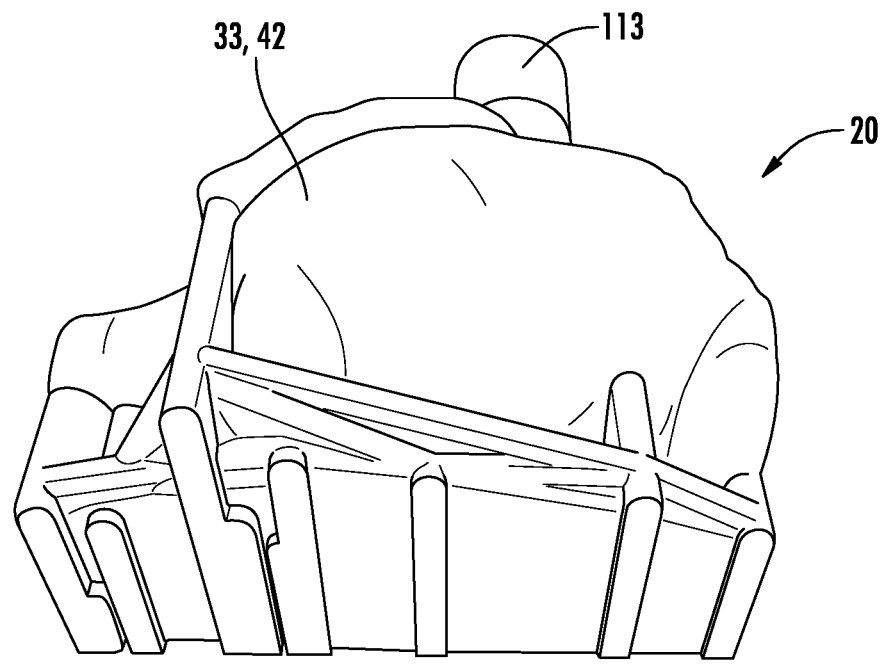
FIG. 8A is an illustration of a precursory structure for a model of a human organ.

FIG. 8A illustrates an embodiment of a precursory structure 20 formed from the method 100 as illustrated in FIGS. 7A-F. Most of what is visible is the third portion 42 of the phase change material 33. FIG. 8A corresponds to FIGS. 2A, 3A, and 4A after the precursory structure is printed in step 4 of FIG. 1.

Figure 8B:
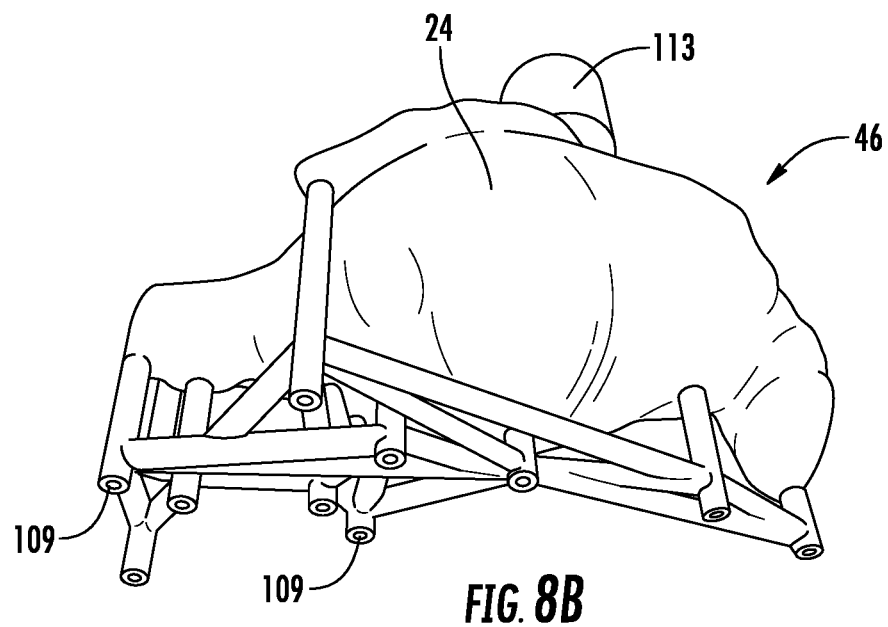
FIG. 8B is an illustration of a mold structure that results from removing phase change material from the precursory structure of FIG. 8A.

FIG. 8B illustrates the hollow mold structure 46 after the phase change material 33 is (mostly) melted and drained leaving a residue on surfaces of the build material 25. Visible is the outer shell 24, the vents 109, and sprue 113. FIG. 8B corresponds to FIGS. 2B and 3B. Step 6 of FIG. 1 converts the precursory structure of FIG. 8A to the shell of FIG. 8B.

Figure 8C:
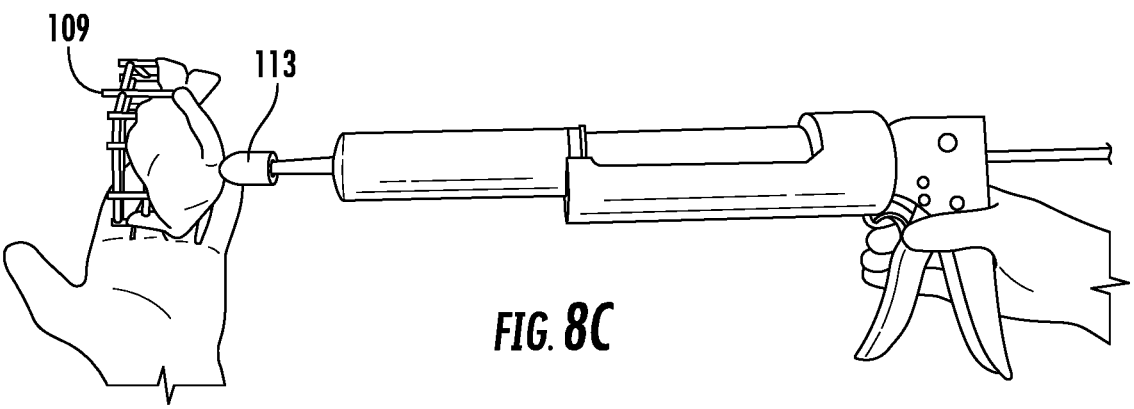
FIG. 8C is an illustration of an uncured flexible polymer being injected into the sprue of the mold structure of FIG. 8B.

FIG. 8C illustrates step 8 of FIG. 1. An uncured liquid flexible polymer 48 is being injected into the sprue 113 while air escapes through the vents 109. After this step, the flexible polymer 48 is allowed to cure.

Figure 8D:
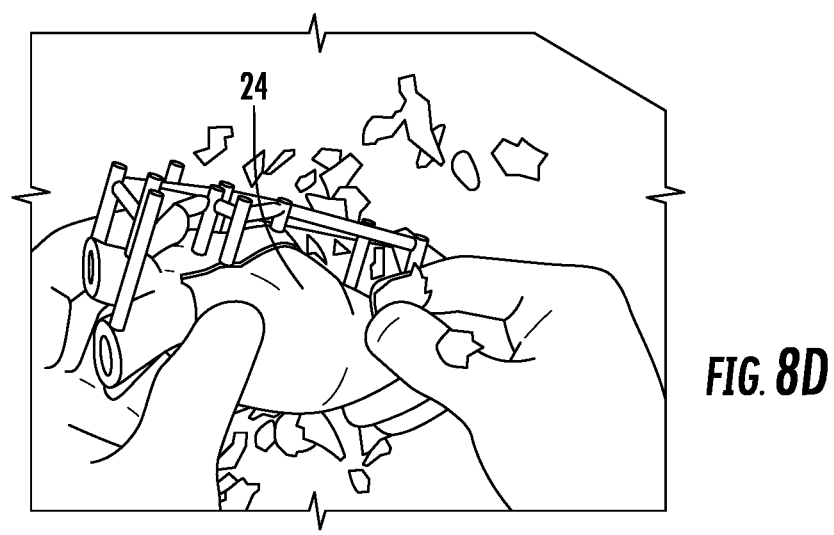
FIG. 8D is an illustration of shell material being cracked and broken away from the cured flexible polymer that had previously been injected as illustrated in FIG. 8C.

FIG. 8D illustrates step 12 of FIG. 1. The inner 22 and outer 24 shell are being cracked and removed from the cured flexible polymer 48. The vents 109 and sprue 113 are also removed at this time.

Figure 9:
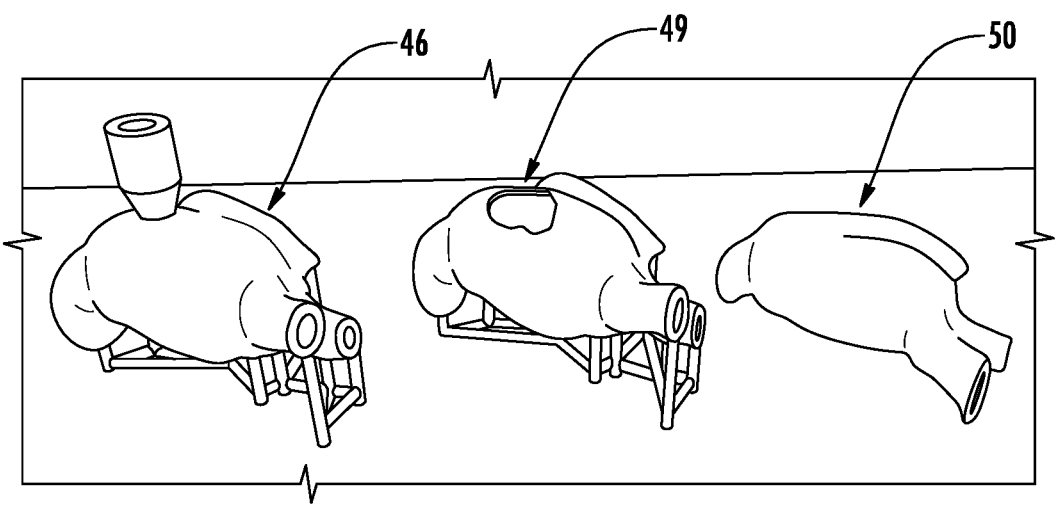
FIG. 9 is an illustration of three stages of manufacturing a hollow model.

FIG. 9 depicts several stages of manufacturing the hollow model 50 including the hollow mold structure 46, partial removal of the shell 49, and the hollow model 50. Compared to current manual processes for forming models 50, the method 100 and 2 disclosed supra is more accurate, efficient, and cost effective.

The foregoing discussion has referred to portions of the hollow model 50 formed defined between an inner 22 and outer 24 shells. This would imply fairly simple geometries for some hollow models 50. However, the methods 2 and 100 can be used to define a very complex hollow model 50. Parts of the model 50 may be formed between shell constructs that are not simple inner and outer shells but more complex manifolds to define the complex geometry. But the principle is the same. Thus, we can refer to a first shell 22 and a second shell 24 between which the uncured polymer 48 is to be injected.

The specific embodiments and applications thereof described above are for illustrative purposes only and do not preclude modifications and variations encompassed by the scope of the following claims.

What is claimed:

1. A method of manufacturing a hollow article formed from a cured flexible polymer material comprising:
    operating an additive manufacturing system to form a precursory structure including:
        an inner shell formed from a build material having an outer surface for defining an inner surface of the hollow article;
        an outer shell formed from the build material having an inner surface for defining an outer surface of the hollow article;
        a first volume formed from a phase change material filling an inner cavity defined by an inner surface of the inner shell;
        a second volume formed from the phase change material filling an outer cavity defined between the inner and outer shells; and
        a support structure formed from the phase change material coupled to an outer surface of the outer shell;
    melting and removing the phase change material;
    injecting uncured liquid polymer material into the outer cavity;
    curing and solidifying the uncured liquid polymer to provide the cured flexible polymer material; and
    cracking and removing the inner shell and the outer shell from the cured flexible polymer material to provide the hollow article, a ratio R of an elongation at break of the cured flexible polymer material relative to the elongation at break of the build material is at least 5 to facilitate cracking and removal of the inner shell and outer shell from the hollow article formed from the cured flexible polymer material.

2. The method of claim 1 wherein the operating the additive manufacturing system includes operating components of a three-dimensional printer including:
    a build plate having an upper surface;
    an elevator mechanism coupled to the build plate;
    a printhead assembly;
    a movement mechanism coupled to the printhead assembly; and
    an ink supply coupled to the printhead assembly.

3. The method of claim 2 wherein operating the additive manufacturing system includes:
    operating the material supply to supply the build material and the phase change material to the printhead;
    operating the elevator mechanism to position the upper surface at a build plane;
    operating the movement mechanism and the printhead assembly to selectively deposit a two-dimensional pattern of the build material and the phase change material that is a cross-section layer of the precursory structure formed onto the upper surface; and
    repeating operating the material supply, elevator mechanism, movement mechanism, and the printhead assembly to complete fabrication of the precursory structure.

4. The method of claim 1 wherein the melting and removing the phase change material removes at least 95 percent of the phase change material but leaves a layer of the phase change material upon surfaces of the inner and outer shell which facilitates release of the inner and outer shell from the cured flexible polymer material during the cracking and removing.

5. The method of claim 1 wherein the inner shell and the outer shell individually have a thickness of at least 0.5 millimeter.

6. The method of claim 5 wherein the inner shell and the outer shell individually have a thickness have a thickness in a range of 0.5 to 1.0 millimeter.

7. The method of claim 1 wherein the precursory structure further includes:
    a sprue that is coupled to the outer cavity; and
    a vent coupled to the outer cavity.

8. The method of claim 7 wherein injecting the uncured polymer material into the outer cavity includes coupling a supply of the uncured polymer material to the sprue and causing displaced air to escape through the vent.

9. The method of claim 8 wherein the vent is a plurality of vents.

10. The method of claim 1 wherein the build material includes an ultraviolet (UV) radiation curable photopolymer.

11. The method of claim 10 wherein the build material has a tensile modulus above 1000 MPa after being cured.

12. The method of claim 10 wherein the build material has an elongation at break of less than 20 percent.

13. The method of claim 12 wherein the build material has an elongation at break in a range of 6 to 12 percent.

14. The method of claim 10 wherein the build material includes a combination of oligomeric and monomeric curable materials, a photoinitiator, a stabilizing agent, and a phase change wax component.

15. The method of claim 1 wherein the phase change material includes a phase change wax component.

16. The method of claim 15 wherein the phase change wax component includes one or more of a hydrocarbon wax, a fatty alcohol wax, a fatty acid wax, a fatty acid ester wax, an aldehyde wax, an amide wax, and a ketone wax.

17. The method of claim 1 wherein the phase change material includes a tackifier.

18. The method of claim 17 wherein the tackifier includes one or more of rosin ester and a rosin alcohol.

19. The method of claim 1 wherein, before forming the precursory structure, the following steps are performed:
    imaging an internal organ of a patient;
    creating a three-dimensional (3D) body file of the internal organ geometry;
    processing the 3D body file to define a 3D file of the precursory structure; and
    preparing the 3D file of the precursory structure for printing with the additive manufacturing system.

20. The method of claim 19 wherein processing the 3D body file includes:
    defining vents that couple to the outer cavity;
    defining a sprue that couples to the outer cavity; and
    defining the first volume, the second volume, and the support structure of the phase change material.

* * * * *